US008602076B2

(12) United States Patent  (10) Patent No.: US 8,602,076 B2
Sato  (45) Date of Patent:  Dec. 10, 2013

(54) PNEUMATIC TIRE

(71) Applicant: The Yokohama Rubber Co., Ltd., Tokyo (JP)

(72) Inventor: Hiroyuki Sato, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 13/624,170

(22) Filed: Sep. 21, 2012

(65) Prior Publication Data

US 2013/0075005 A1  Mar. 28, 2013

(30) Foreign Application Priority Data

Sep. 27, 2011 (JP) ................. 2011-211444

(51) Int. Cl.
*B60C 13/00* (2006.01)
(52) U.S. Cl.
USPC .......................................... 152/523; D12/605
(58) Field of Classification Search
USPC ............................ 152/523, 209.16; D12/605
See application file for complete search history.

(56) References Cited

U.S. PATENT DOCUMENTS

2008/0283169 A1* 11/2008 Sato et al. ................. 152/450
2011/0253278 A1* 10/2011 Tokizaki et al. ........... 152/523

FOREIGN PATENT DOCUMENTS

| JP | 64-16407 A | 1/1989 |
|---|---|---|
| JP | 11-321243 A | 11/1999 |
| JP | 2000-118208 A | 4/2000 |
| JP | 2001-191745 A | 7/2001 |
| JP | 2008-273505 A | 11/2008 |
| JP | 2010254088 | * 11/2010 |
| JP | 2011-037388 A | 2/2011 |
| JP | 2011-105231 A | 6/2011 |

OTHER PUBLICATIONS

Japanese Office Action of corresponding Japanese Patent Application No. 2011-211444, dated on Feb. 5, 2013.
Decision to Grant a Patent of corresponding Japanese Patent Application No. 2011-211444, dated on May 7, 2013.

* cited by examiner

*Primary Examiner* — Justin Fischer
*Assistant Examiner* — Robert Dye
(74) *Attorney, Agent, or Firm* — Global IP Counselors, LLP

(57) ABSTRACT

A pneumatic tire has a sidewall comprising a plurality of circumferentially oriented pattern element rows having a plurality of pattern elements defining an identical contour shape in succession in a tire circumferential direction, and a plurality of radially oriented pattern element rows having a plurality of pattern elements in succession in a tire radial direction. The light-reflectance properties of each pattern element changes in one direction and determine the orientation in which the pattern elements are arranged relative to the tire circumferential or radial direction. When the pattern elements are viewed along the circumferentially oriented pattern element rows, the arrangement orientation changes periodically along the tire circumferential direction. When the plurality of pattern elements are viewed along each of the radially oriented pattern element rows, the arrangement orientation between adjacent pattern elements is different, and the absolute value of the difference in the arrangement orientation angles is fixed.

20 Claims, 11 Drawing Sheets

SURFACE ROUGHNESS: a < b < c < d

PNEUMATIC TIRE

CROSS-REFERENCE TO RELATED APPLICATION

This application claims priority to Japanese Patent Application No. 2011-211444, filed on Sep. 27, 2011, the entire disclosure of Japanese Patent Application No. 2011-211444 is hereby incorporated herein by reference.

BACKGROUND

1. Field of the Invention

The present invention relates to a pneumatic tire having a sidewall on which an outer surface has been patterned.

2. Background Information

In order to achieve a lighter weight and a lower rolling resistance in a pneumatic tire, the thickness (hereinafter also referred to as the side gauge) of the sidewall is continually being reduced. However, when the side gauge is reduced, there is a tendency for the surface of the sidewall to present an undesirable outer appearance. For example, uneven parts can form in local areas on the outer surface of the sidewall. The number of occurrences of other type of deficiencies in the sidewall may also increase. Although an undesirable outer appearance does not having adversely affect the durability or motion performance of the tire, a user may question whether or not such a tire is defective.

In the molding step performed during the manufacture of a tire, a sheet-shaped carcass member is wound once around a tire molding drum, and the originating and terminating ends of the wound carcass member partially overlap to form a joint. For this reason, the overlapped portion is of greater relative thickness, and takes on an uneven appearance on the outer surface of the sidewall in the tire. This unevenness is particularly noticeable in a radial tire for which a single carcass member is used.

Japanese Laid-open Patent Publication No. 2011-37388 describes a tire in which any unevenness occurring on the outer surface of the sidewall of the tire is obscured. On a decorative part extending as a strip in the circumferential direction of the pneumatic tire on the outer surface, a first ridge group and a second ridge group are formed. The first and second ridge groups are made of a plurality of ridges that are arranged so as to extend in the radial direction of the tire at a predetermined pitch. Each of the ridges of the first ridge group and each of the ridges of the second ridge group intersect with each other to form a moiré pattern which makes it possible to obscure any unevenness present on the outer surface of the sidewall.

Also, Japanese Laid-open Patent Publication No. 2008-273505 describes a pneumatic tire whose outer appearance can be enhanced by causing the light reflectance of the outer surface of the sidewall to vary. In this type of pneumatic tire, an uneven part is formed on at least a part of the outer surface of the sidewall. In the uneven part, recesses and protrusions are disposed in alternation, such that at least some of the recesses are made of a mirror surface having an arithmetic average surface roughness (Ra) of 0.4 to 1.5 μm, and a surrounding region that encloses the mirror surface is made of a rough surface where the Ra is greater than 1.5 μm.

SUMMARY

As is described in Japanese Laid-open Patent Publication No. 2011-37388, a recess present on the outer surface of the sidewall can be obscured using the moiré pattern formed by the intersection of the ridges of the first ridge group and each of the ridges of the second ridge group. Furthermore, using the technique described in Japanese Laid-open Patent Publication No. 2008-273505 to adjust the arithmetic average surface roughness Ra of the outer surface of the sidewall makes it possible to enhance the outer appearance of the tire. However, there is still a need for a technique to sufficiently obscure the unevenness of the outer surface of the sidewall.

It is therefore an object of the present invention to provide a pneumatic tire in which any unevenness present on the outer surface of the sidewall is sufficiently obscured.

One aspect of the present invention thus provides a pneumatic tire in which an outer surface of a sidewall has been imparted with a pattern. In this pneumatic tire, the outer surface of the sidewall comprises a plurality of circumferentially oriented pattern element rows, where a plurality of pattern elements defining an identical contour shape are provided in succession in a circumferential direction. The sidewall also comprises a plurality of radially oriented pattern element rows, where a plurality of pattern elements defining a contour shape identical to that of each of the pattern elements of the circumferentially oriented pattern element rows are provided in succession in a radial direction of the tire relative to each of the respective pattern elements of the circumferentially oriented pattern element rows. The sidewall further comprises a background surface enclosing each of the pattern elements of the circumferentially oriented pattern element rows and the radially oriented pattern element rows.

The light-reflectance properties in each of the plurality of pattern elements change in one direction in a continuous manner or in a stepwise manner, whereby the orientation in which each of the plurality of pattern elements is arranged relative to the circumferential or radial direction of the tire is determined. The arrangement orientation changes periodically along the circumferential direction of the tire when the plurality of pattern elements are viewed along each of the circumferentially oriented pattern element rows. The arrangement orientation is different between adjacent pattern elements when the plurality of pattern elements are viewed along each of the radially oriented pattern element rows, and the absolute value of the difference in angle of the arrangement orientation between adjacent pattern elements is fixed.

The surface roughness of each of the plurality of pattern elements is preferably made to change in one direction, whereby the light-reflectance properties are changed. The surface light-reflectance properties in each of the plurality of pattern elements preferably change in a stepwise manner in the one direction, and a region having the same light-reflectance properties accounts for 20 to 80% of the element surface area of each of the plurality of pattern elements.

In each of the circumferentially oriented pattern element rows, the distance separating the plurality of pattern elements adjacent in the circumferential direction of the tire is preferably no greater than the maximum width, in the circumferential direction of the tire, of each of the plurality of pattern elements. Also, the sum of the element surface areas of the plurality of pattern elements is preferably at least 50% of the surface area of a pattern region where the plurality of pattern elements are enclosed by the background surface.

The surface roughness of each of the plurality of pattern elements is preferably made to change in one direction, whereby the light-reflectance properties are changed, and the variation width between the maximum roughness and the minimum roughness of the surface roughness changes periodically within the circumferentially oriented pattern element rows. The variation width preferably changes in the same period as the periodic changes of the arrangement orientation in each of the circumferentially oriented pattern element rows, and the arrangement orientation in each of the circumferentially oriented pattern element rows undergoes periodic changes over a plurality of periods.

The size of the plurality of pattern elements may be made to decrease in an inward progression in the radial direction of the tire while the same contour shape is maintained when the plurality of pattern elements are viewed along the radially oriented pattern element rows. The circumferentially oriented pattern element rows may be made to have periodic wavelike fluctuations in the radial direction of the tire. The radially oriented pattern element rows may also be made to have periodic wavelike fluctuations in the circumferential direction of the tire.

The pattern elements may also form either a circular shape or a rectangular shape. When the plurality of pattern elements are viewed along each of the radially oriented pattern element rows, the radially oriented pattern element rows may also have a portion where the direction in which the arrangement orientation between adjacent pattern elements changes is reversed. The circumferentially oriented pattern element rows, the radially oriented pattern element rows, and the background surfaces are provided to a pattern display region on the outer surface of the sidewall. Also, the pattern display region is provided, for example, so as to enclose a marking display region provided to the outer surface of the sidewall of the pneumatic tire.

Accordingly, the pneumatic tire described above sufficiently obscures any unevenness present in the outer surface of the sidewall.

BRIEF DESCRIPTION OF THE DRAWINGS

Referring now to the attached drawings which form a part of this original disclosure.

DETAILED DESCRIPTION OF EMBODIMENTS

Selected embodiments of a pneumatic tire will now be explained with reference to the drawings. It will be apparent to those skilled in the art from this disclosure that the following descriptions of the embodiments are provided for illustration only and not for the purpose of limiting the invention as defined by the appended claims and their equivalents. Also, the circumferential direction of the tire as mentioned hereinbelow refers to the direction of rotation of a tread part when the tread part is caused to rotate about the rotational axis of the tire, and the radial direction of the tire refers to the direction extending radially from the rotational axis of the tire.

Figure 1:
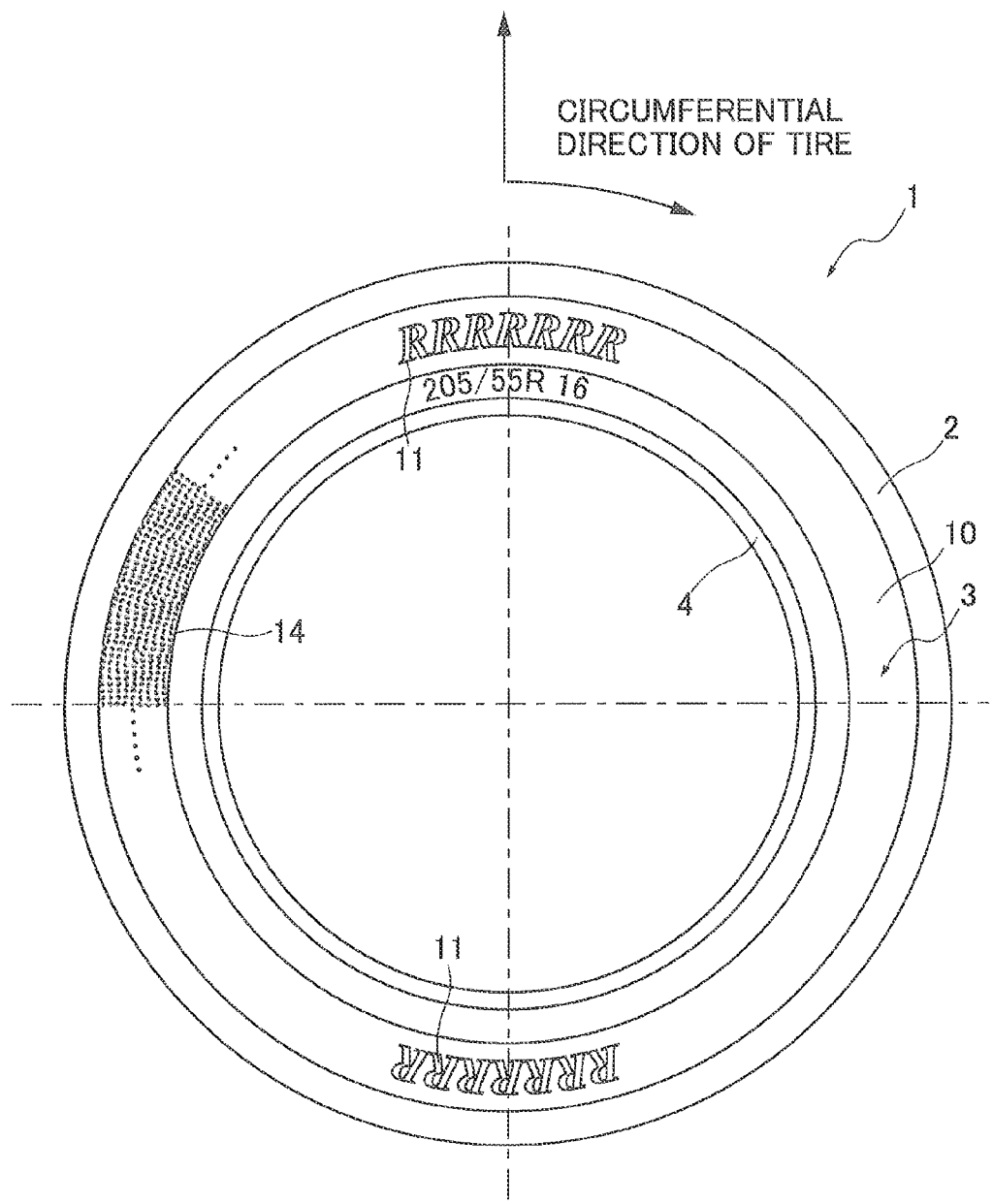
FIG. 1 schematically illustrates an outer surface of a sidewall of a pneumatic tire according to a disclosed embodiment.

FIG. 1 schematically illustrates an outer surface of a sidewall 3 (see FIG. 2) of a pneumatic tire ("tire") 1 according to a disclosed embodiment. FIG. 1 does not depict a tread pattern near the end of a pattern of a tread 2. On the outer surface of the sidewall 3 are displayed a brand name and the tire manufacturer name (not shown), as well as the size or other text, symbols, numbers, or the like. In FIG. 1, a plurality of circular pattern elements are arranged along the circumferential direction and the radial direction of the tire on the outer surface of the sidewall 3, thereby producing a pattern which is illustrated by a side-pattern display region 10.

Figure 2:
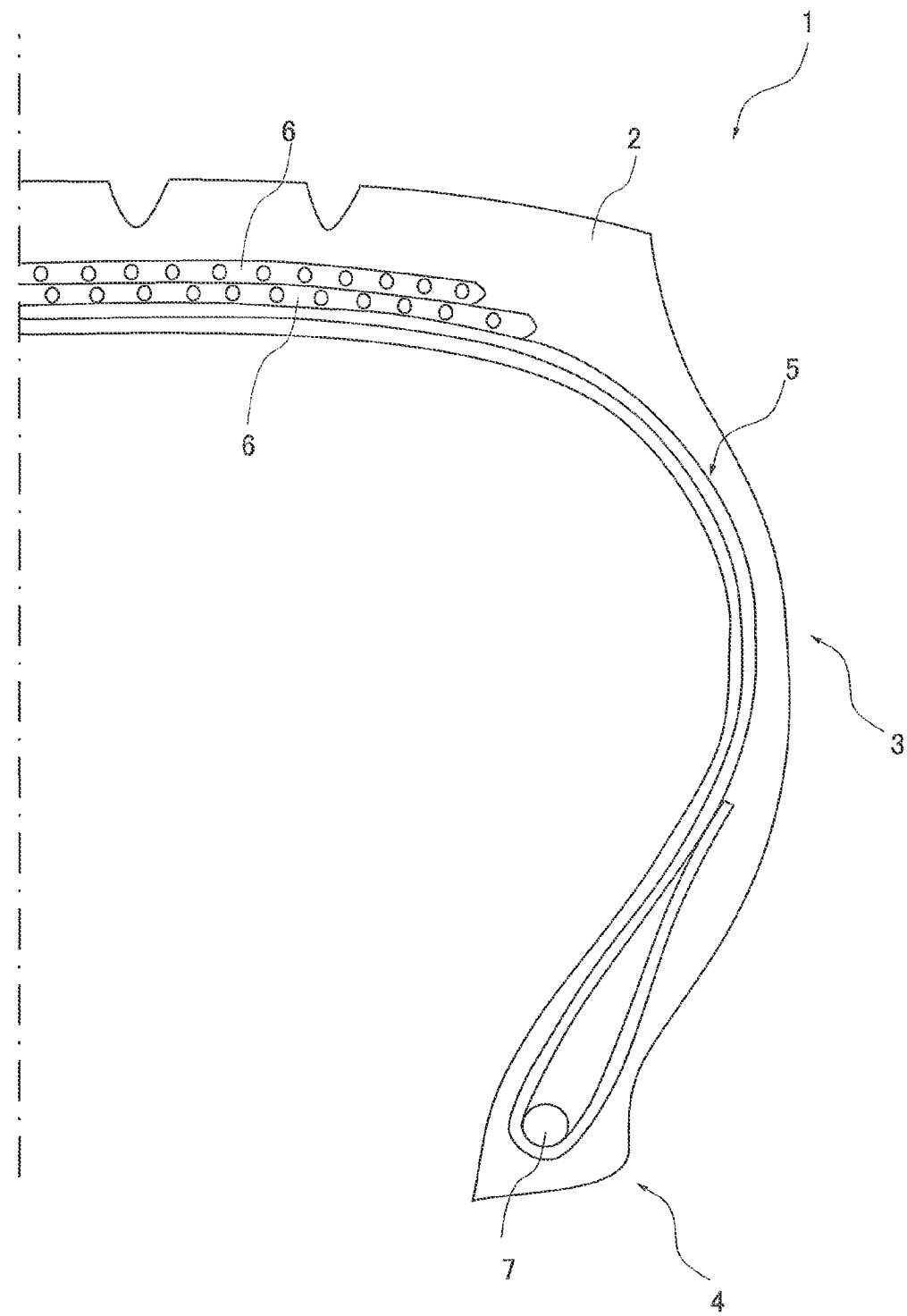
FIG. 2 is a half-section of a tire when the tire is cut so as to include the rotational axis of the tire.

FIG. 2 is a half-section of the tire 1 when it is cut so as to include the rotational axis. The tire 1, as illustrated in FIG. 2, has the tread 2, the sidewall 3, a bead 4, a carcass layer 5, and belt layers 6. In addition, although not depicted, the tire 1 has an inner liner layer and the like as understood in the art. The sidewall 3 and the bead 4, which has a bead core 7, are disposed as a pair on either side of the tread 2 in the tire width direction.

The carcass layer 5 comprises a carcass ply material. The carcass ply material is a member having a rubber-covered organic fiber, the member being wound between a pair of annular bead cores 7 to define a toroidal shape, and has a single ply material. The carcass ply material is wound about the bead core 7 and ends further inward in the radial direction of the tire than the maximum width position of the tire. The carcass ply is also wound about the bead core 7 and ends at a lower part of the sidewall 3 further inward in the radial direction of the tire than the maximum width position of the tire.

Two belts are provided as the belt layers 6 to the outside of the carcass ply material in the radial direction of the tire. The belt is a member made by using rubber to cover steel cord inclined relative to the circumferential direction of the tire at a predetermined angle within a range of e.g., 20° to 30°, and the lower-layer belt is wider in the tire width direction than the upper-layer belt. The steel cords of the two belt layers are inclined in mutually opposite directions. For this reason, the belt is a composite layer, and swelling of the carcass ply material caused by the air with which is it filled is suppressed. Although not depicted, a belt cover material made by covering rubber with organic fibers may also be provided to the outside of the belt layers 6 in the radial direction of the tire, so as to reinforce the aforementioned function of the belt layers 6.

A tread rubber member is provided to the outside of the belt layers 6 in the radial direction of the tire to form the tread 2. A side rubber member is connected to an end part of the tread rubber member to form the sidewall 3. The side rubber member is provided to the outside of the carcass layer 5 in the tire width direction. An inward end of the side rubber member in the radial direction of the tire is provided with a rim-cushioning rubber member, which is in contact with a rim on which the tire 1 is mounted. A bead filler rubber member is provided to the outside of the bead core 7 in the radial direction of the tire so as to be sandwiched between a portion of the carcass ply material before it is wound about the bead core 7 and a portion of the carcass ply material after it has been wound about the bead core 7. An inner liner layer made of an inner liner rubber member is provided to an inner surface of the tire 1 which faces a tire cavity region filled with air and enclosed by both the tire 1 and the rim.

The side-pattern display region 10 and the marking display region 11 are provided on the circumference of the tire on the outside surface of the sidewall 3, as illustrated in FIG. 1. The marking display region 11 displays a product name of the tire, a brand name, and a name of the manufacturer of the tire, as well as the size or other data, symbols, numbers, or the like. The side-pattern display region 10 is provided around the marking display region 11 so as to enclose the marking display region 11. The side-pattern display region 10 (described below) may be provided to one sidewall 3 in the width direction of the tire 1, or may be provided to sidewalls 3 on both sides in the width direction of the tire 1.

Figure 3:
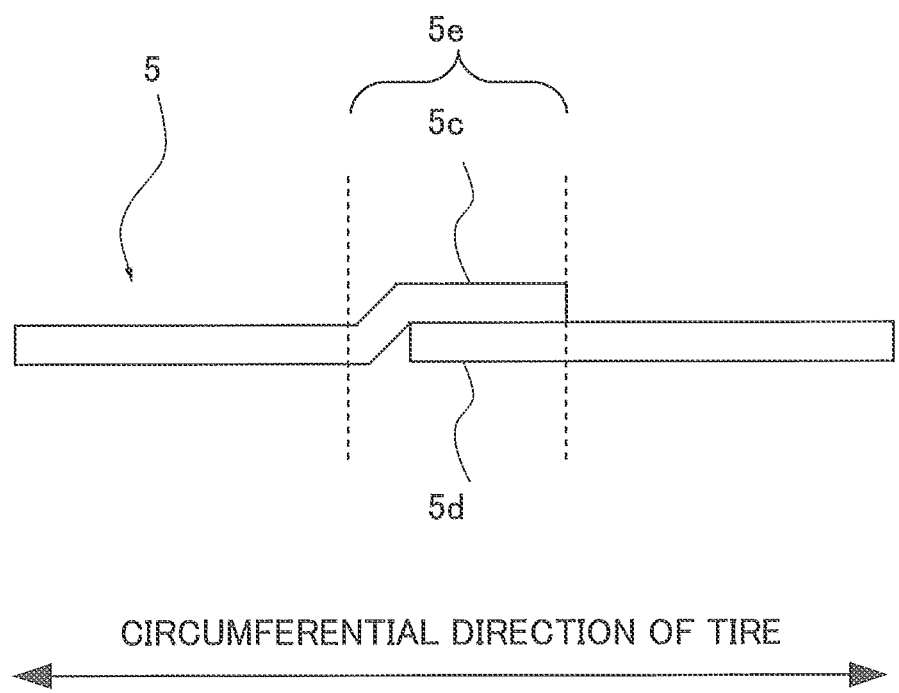
FIG. 3 illustrates one example of a cause for the incidence of unevenness on the outer surface of the sidewall.

As illustrated in FIG. 1, identically sized small, circular pattern elements 14 are lined up in an orderly manner on the side-pattern display region 10 along the circumferential direction and the radial direction of the tire. The surface roughness (arithmetic average roughness) of the pattern elements 14 changes along one direction, e.g., from a greater surface roughness to a lesser one, whereby the arrangement orientation of the pattern elements 14 is determined. Causing the arrangement orientation of the pattern elements 14 to change in accordance with the position in the circumferential direction and the position in the radial direction of the tire causes a person viewing the sidewall 3 to experience an optical illusion such that the side-pattern display region 10 appears to have three-dimensional unevenness. This makes it possible to obscure the unevenness formed on the outer surface of the sidewall 3. FIG. 3 is a drawing illustrating one example of a cause for the occurrence of the unevenness appearing on the outer surface of the sidewall 3. For example, a terminating end 5c of the wound carcass layer 5 can be overlapped on an originating end 5d thereof at a portion 5e to thereby create unevenness on the outer surface of the sidewall 3, as illustrated in FIG. 3.

Figure 4A:
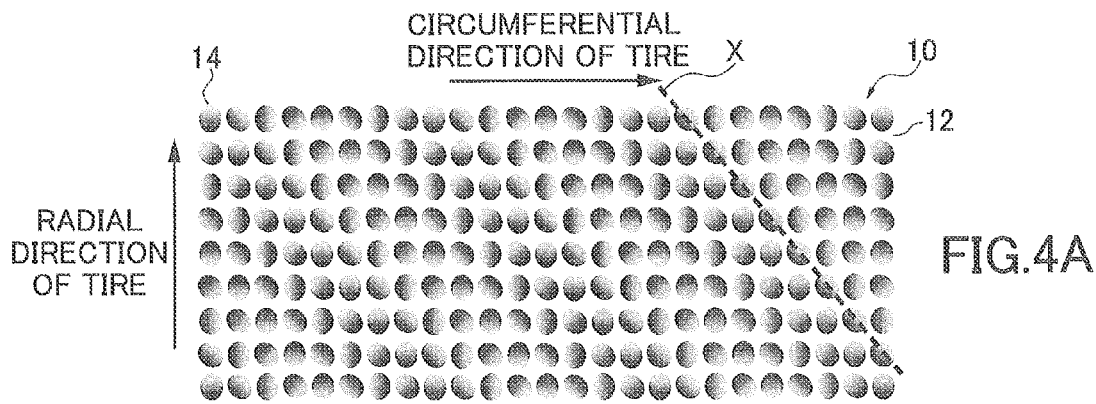
FIG. 4A represents a pattern on the outer surface of the sidewall deployed in a straight line.

FIG. 4A is a drawing where a pattern on the outer surface of the sidewall 3 has been deployed in a straight line. In FIG. 4A, the lateral direction corresponds to the circumferential direction, and the longitudinal direction corresponds to the radial direction of the tire. A background surface 12 and a plurality of the pattern elements 14 are provided to the side-pattern display region 10 on the outer surface of the sidewall 3. The pattern elements 14 are formed having identically sized circular shapes, and are enclosed by the background surface 12. The pattern elements 14 form rows along the circumferential direction and also along the radial direction of the tire. More specifically, a plurality of the pattern elements 14 which are formed having identical, circular, contour shapes and are each enclosed by the background surface 12 form a plurality of circumferentially oriented pattern element rows in succession in the circumferential direction in the side-pattern display region 10. Further, a plurality of the pattern elements 14 formed having a circular, contour shape identical to that of each of the pattern elements 14 in the circumferentially oriented pattern element rows and which are each enclosed by the background surface 12 form a plurality of radially oriented pattern element rows in succession in the radial direction of the tire relative to each of the pattern elements 14 of the circumferentially oriented pattern element rows. The size of the pattern elements 14 is, for example, a diameter of 5 to 10 mm. The pattern elements 14 may be provided on the same surface as the background surface 12, or may be provided depressed relative to the background surface 12 by, for example, 0.3 to 3.0 mm.

In the pattern illustrated in FIG. 4A, arranging the pattern elements 14 as shall be described below causes there to appear to be formed an unevenness extending in a direction running along the dashed line X in FIG. 4A. This pattern causes any unevenness actually present on the sidewall 3 to be more easily obscured.

Figure 4B:
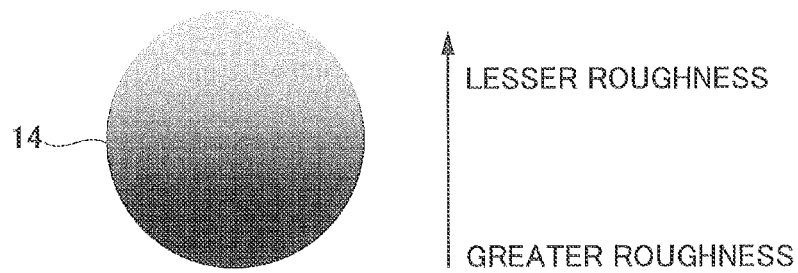
FIG. 4B represents one example of a single pattern element of the tire shown in FIG. 1.
Figure 4C:
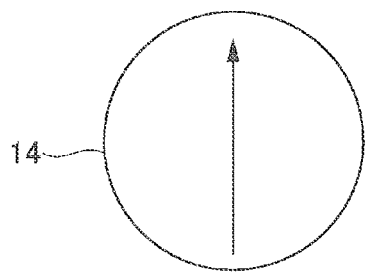
FIG. 4C represents an illustration with an arrow indicating an orientation in which the pattern element of the tire shown in FIG. 1 is arranged.

FIG. 4B is a drawing illustrating one example of a single pattern element 14. As shown in FIG. 4B, the surface roughness of an individual pattern element 14 changes along the one direction from a greater roughness to a lesser roughness. For this reason, a majority of the light incident on the portion of greater roughness is diffused and reflected, and will be visually perceptible to a viewer with a small amount of light. By contrast, a majority of the light incident on the portion of lesser roughness is specularly reflected and will be visually perceptible to a viewer with a large amount of light. For this reason, the viewer perceives the portion of greater roughness to be black, and the portion of lesser roughness to be white. Thus, the light-reflectance properties of the pattern elements 14 change in the one direction within the pattern elements 14, whereby the orientation in which each of the pattern elements 14 is arranged relative to the circumferential direction or the radial direction of the tire is determined. The pattern element 14 illustrated in FIG. 4B is determined to be arranged, for example, in an upward orientation in FIG. 4B. Such an arrangement orientation is represented as illustrated in FIG. 4C and shall be described hereinafter. With the pattern element 14 illustrated in FIG. 4B, the surface roughness changes continuously, and therefore the reflectance properties also change continuously. The vulcanization mold used when the tire 1 is produced has serrated surfaces in portions corresponding to the pattern elements 14, and using the vulcanization mold to produce the tire 1 yields pattern elements 14 having surface roughness. Determining, for example, the depth, width, and density at which the serrations are machined allows the surface roughness to be increased or decreased. More specifically, when the surface roughness is expressed as an arithmetic average roughness Ra, then the Ra of the portion of "greater roughness" (maximum Ra) is, for example, 1.7 to 2.5 μm, and the Ra of the portion of "lesser roughness" (minimum Ra) is, for example, 0.4 to 0.7 μm.

When the plurality of pattern elements 14 are viewed along each of the circumferentially oriented pattern element rows, that is, when the pattern elements 14 in FIG. 4A are viewed row by row along the circumferential direction, then the arrangement orientation of the plurality of pattern elements 14 illustrated in FIG. 4A changes periodically along the circumferential direction. When the pattern elements 14 are viewed along each of the radially oriented pattern element rows, that is, when the pattern elements 14 in FIG. 4A are viewed row by row along the radial direction of the tire, then the arrangement orientation between adjacent pattern elements 14 is different, and the absolute value of the difference in the angles of the arrangement orientations between adjacent pattern elements 14 is fixed. Having the absolute value of the difference in the angles be fixed means that fluctuation of the absolute value of the difference in the angles falls within a permissible range, for example, within 5°. The "absolute value of the difference in the angles" means that in a case where, for example, the arrangement orientation is 0°, 48°, 93°, and 137° relative to the circumferential direction, then the absolute value of the difference in the angles is 48° (=48°−0°), 45° (=93°−48°), and 44° (=137°−93°). At such a time, although the absolute value of the difference in the angles fluctuates by 4° (i.e., the absolute value of the maximum difference 48° less the absolute value of the minimum difference 44°), this 4° difference falls within the permissible range (within 5°), and therefore the absolute value of the difference in the angles can be regarded to be a fixed value.

Thus, the absolute value of the difference in the angles of the arrangement orientation is fixed with respect to the arrangement orientation between pattern elements 14 which are adjacent in the radial direction of the tire. In this embodiment, the orientation in which pattern elements 14 neighboring in the circumferential direction and the radial direction of the tire are arranged changes in 45° increments. However, provided that the change in the arrangement orientation is no more than 90°, there is an optical illusion such that the pattern made by the pattern elements 14 appears to have a three-dimensional unevenness, as shall be described below. Preferably, the change in the arrangement orientation is no more than 45°.

Figure 4D:
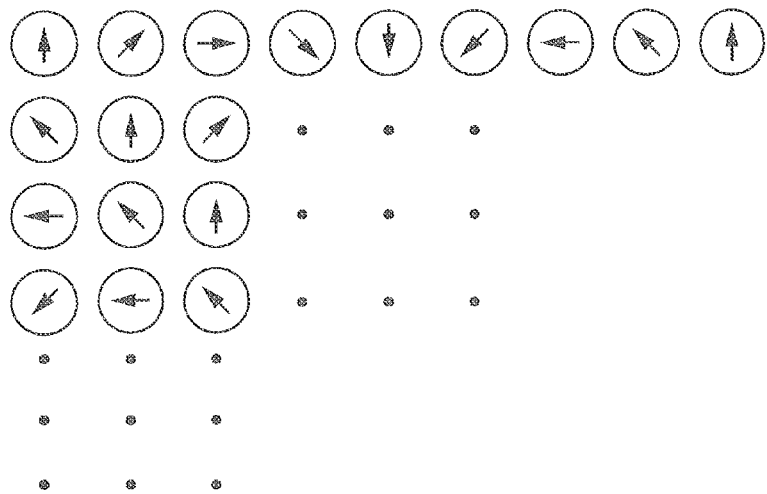
FIG. 4D the change in the orientation in which the pattern elements illustrated in FIG. 4A are arranged, with an arrow indicating the arrangement orientation of the pattern elements.

FIG. 4D represents the change in the orientation in which the pattern elements illustrated in FIG. 4A are arranged, with an arrow indicating the arrangement orientation of the pattern elements. FIG. 4D thus illustrates the change in the arrangement orientation of the pattern elements 14. As illustrated in FIG. 4D, the arrangement orientation of the pattern elements 14 changes in 45° increments in a clockwise rotation along the circumferential direction of the tire. As such, the arrangement orientation of the pattern elements 14 changes periodically along the circumferential direction.

By contrast, the arrangement orientation of the pattern elements 14 changes in 45° increments in a clockwise rotation along the radial direction of the tire. As such, the angles of the arrangement orientation of the pattern elements 14 which are neighboring in the radial direction of the tire are different, but the absolute value of the difference thereof consistently has zero fluctuation. Specifically, the absolute value of the difference in the angles of the arrangement orientation is fixed.

Arranging the pattern elements 14 in this manner makes the viewer perceive three-dimensional unevenness, as illustrated in FIG. 4A. As such, in a case where the arrangement of the pattern elements 14 illustrated in FIG. 4A is applied to the sidewall 3, the viewer will perceive an optical illusion in that three-dimensional unevenness appears on the outer surface of the sidewall 3. Thus, any unevenness actually occurring on the sidewall 3 will be readily obscured.

The circumferentially oriented pattern element rows and the radially oriented pattern element rows are linear in this embodiment, but may also be curved or bent. Further, when the plurality of pattern elements 14 are viewed along the radially oriented pattern element rows, then the size of the plurality of pattern elements 14 may also be made to decrease in an inward progression in the radial direction of the tire while the same contour shape is maintained.

Figure 5:
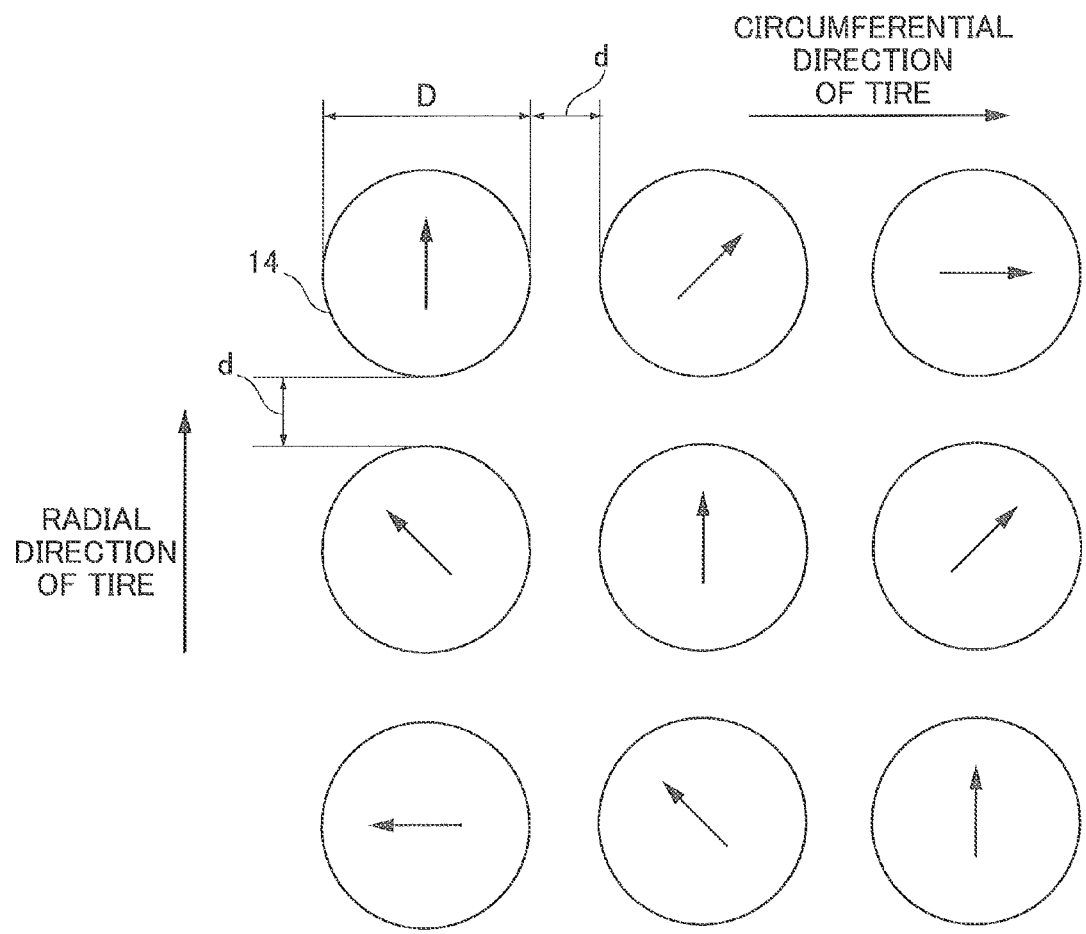
FIG. 5 illustrates the distance separating neighboring pattern elements in the present embodiment.

In order for the above-described effect to be more effectively brought about, preferably D>d, where D is the diameter of the circular pattern element 14 and d is the separation distance between pattern elements 14 which are neighboring in the circumferential and radial directions of the tire, as illustrated in FIG. 5. In a case where d≥D, the effect of the optical illusion of the pattern described above is appreciable diminished. More specifically, in each of the circumferentially oriented pattern element rows, the separation distance d between pattern elements which are adjacent in the circumferential direction of the tire for a plurality of the pattern elements is preferably no greater than diameter D, which is the maximum width of the pattern elements 14 in the circumferential direction of the tire. Further, in order for the above-described effect to be more effectively brought about, the sum of the element surface area of all the pattern elements 14 is preferably at least 50% of that of the side-pattern display region 10 of the sidewall 3. That is, the sum of the element surface area of all the pattern elements 14 is at least 50% of the surface area of the pattern region in which all of the pattern elements 14 are enclosed by the background surface 12. The effect of the optical illusion described above is diminished in a case where the sum of the element surface area of all the pattern elements 14 is less than 50% of the surface area of the pattern region where all of the pattern elements 14 are enclosed by the background surface 12.

Figure 6A:
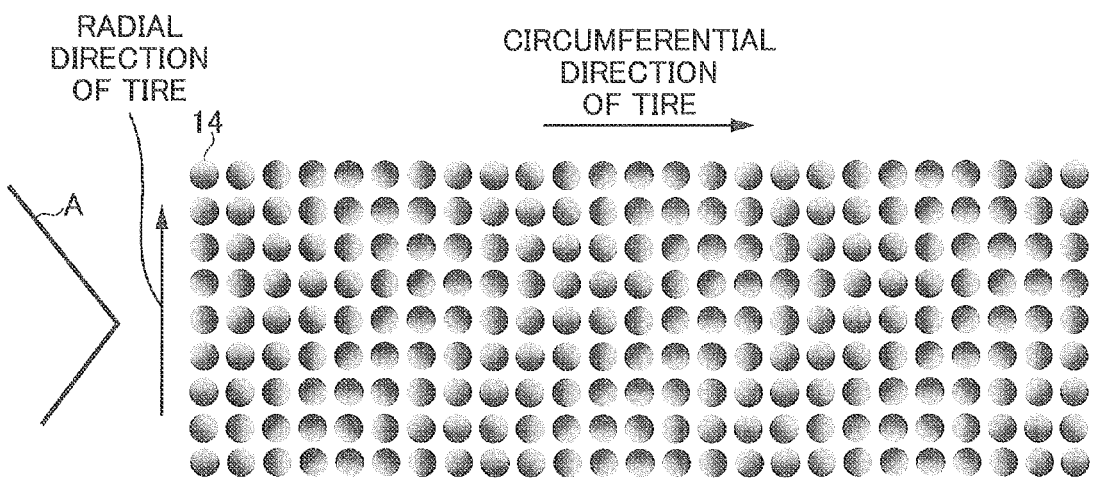
FIG. 6A indicates a modification of the embodiment shown in FIG. 1.
Figure 6B:
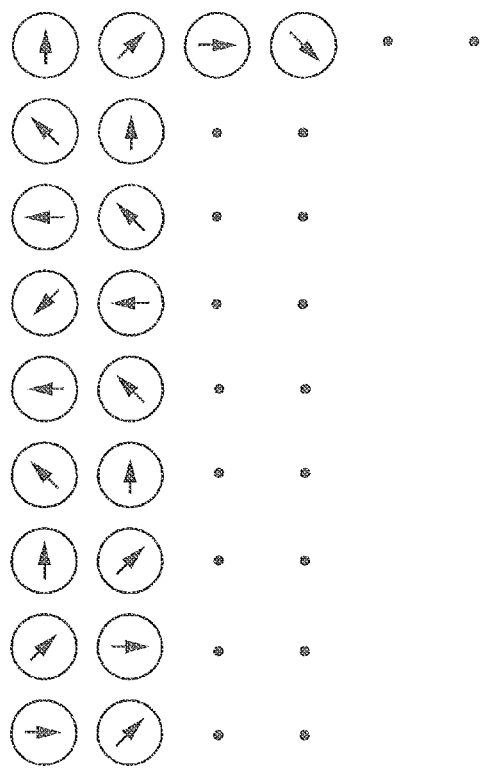
FIG. 6B uses arrows to indicate the orientation in which the pattern elements in the left end portion illustrated in FIG. 6A are arranged.

FIG. 6A is an illustration of a modification of the embodiment of the pattern elements 14. FIG. 6B is an illustration of the orientations in which the pattern elements 14 in the left end portion illustrated in FIG. 6A are arranged, using arrows.

In this modification, the arrangement orientation of the pattern elements 14 changes periodically along the circumferential direction when the plurality of pattern elements 14 are viewed along each of the circumferentially oriented pattern element rows. Meanwhile, the arrangement orientation of the pattern elements 14 changes in 45° increments when the plurality of pattern elements 14 are viewed along each of the radially oriented pattern element rows. This causes a viewer to experience an optical illusion such that unevenness appears bent, as indicated by the solid line A illustrated in FIG. 6A, rather appearing extending in the direction along the dashed line X illustrated in FIG. 4A.

In the pattern illustrated in FIG. 6A, the direction of change of the arrangement orientation is reversed in the fourth and fifth positions, when counting from the pattern elements 14 at the uppermost position in the radially oriented pattern element row at the left end, as illustrated in FIG. 6B. For this reason, the pattern illustrated in FIG. 6A has a white region that is bent as per the L-shaped solid line A, and moreover, a viewer experiences an optical illusion such that there appears to be three-dimensional unevenness in the vicinity of the white region. Thus, a viewer will still experience an optical illusion such that three-dimensional unevenness appears to be present even in a case where the outer surface of the sidewall 3 of the tire 1 has been patterned as illustrated in FIG. 6A. For this reason, even though there may be unevenness actually present on the outer surface of the sidewall 3, the actual unevenness is more readily obscured.

Also in this modification, the arrangement orientation between adjacent pattern elements 14 is different when the pattern elements 14 are viewed row by row along the radial direction of the tire, and the absolute value of the difference in the angles of the arrangement orientation is fixed. More specifically, in the second modification there is adopted a configuration such that when the arrangement orientation of the pattern elements 14 in the radially oriented pattern element rows is viewed in sequence along the radial direction of the tire, the arrangement orientation moves in a clockwise or counterclockwise rotation, and the change in the angles of the arrangement orientation thereof is also fixed. However, when the arrangement is oriented in a predetermined direction, the direction of movement of the arrangement orientation is inverted (changing to counterclockwise rotation if already in clockwise rotation, and to clockwise rotation if already in counterclockwise rotation). The absolute value of the difference in the angles of the arrangement orientation of adjacent pattern elements at such a time is fixed, which means, as described above, that the absolute value of the difference in the angles fluctuates within a permissible range (within 5°).

Figure 7:
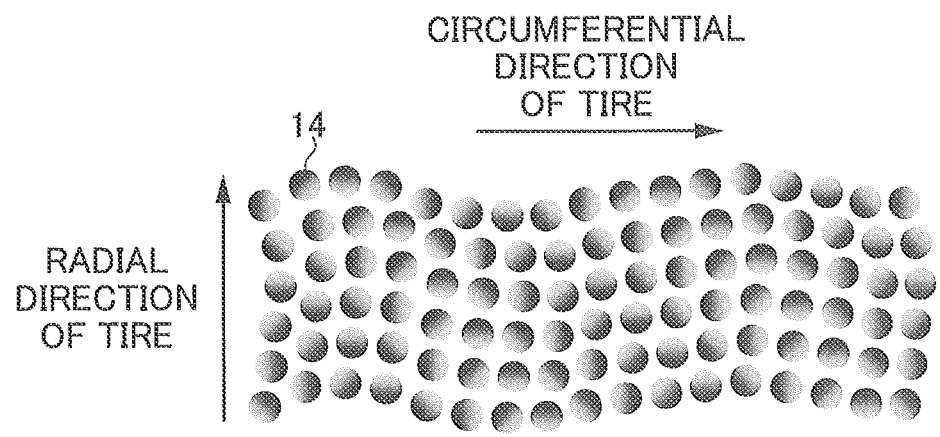
FIG. 7 illustrates another modification of the embodiment shown in FIG. 1.

FIG. 7 is an illustration of another modification of the embodiment of the pattern elements 14. The pattern elements 14 of the second modification are provided with an arrangement orientation identical to the arrangement orientation of the pattern elements 14 illustrated in FIG. 4A, but the circumferentially oriented pattern element rows have periodic, wavelike fluctuations in the radial direction of the tire. The period of the wavelike fluctuations is preferably, for example, equal to the period of the arrangement orientation in the circumferentially oriented pattern element rows. In addition, the phase when the wavelike fluctuation occurs is preferably consistent with the phase in the change in the arrangement orientation, which means that the arrangement of the pattern elements 14 at the position of maximum displacement in the wavelike fluctuation is oriented in the radial direction of the tire or in the circumferential direction.

In this modification, the radially oriented pattern element rows also have periodic, wavelike fluctuations in the circumferential direction. The period of the wavelike fluctuations is preferably, for example, equal to the period of the arrangement orientation in the radially oriented pattern element rows. In addition, the phase when the wavelike fluctuations occur is preferably consistent with the phase in the change in the arrangement orientation.

Causing the circumferentially oriented pattern element rows and the width-direction pattern element rows to have wavelike, periodic fluctuations causes a viewer to experience an optical illusion such that the pattern illustrated in FIG. 7 appears to have a three-dimensional unevenness. At such a time, the phase of the fluctuations of the circumferentially oriented pattern element rows and the width-direction pattern element rows is preferably made to be consistent with the phase of the arrangement orientation. Therefore, a viewer will still experience an optical illusion such that a three-dimensional unevenness appears to be present even in a case where the outer surface of the sidewall 3 of the tire 1 has been patterned as illustrated in FIG. 7. For this reason, even though there may be unevenness actually present on the outer surface of the sidewall 3, the actual unevenness is more readily obscured. In this modification, both the circumferentially oriented pattern element rows and the radially oriented pattern element rows are given the wavelike fluctuations, but the wavelike fluctuations may also be imparted to only one of either the circumferentially oriented pattern element rows or the radially oriented pattern element rows.

Figure 8:
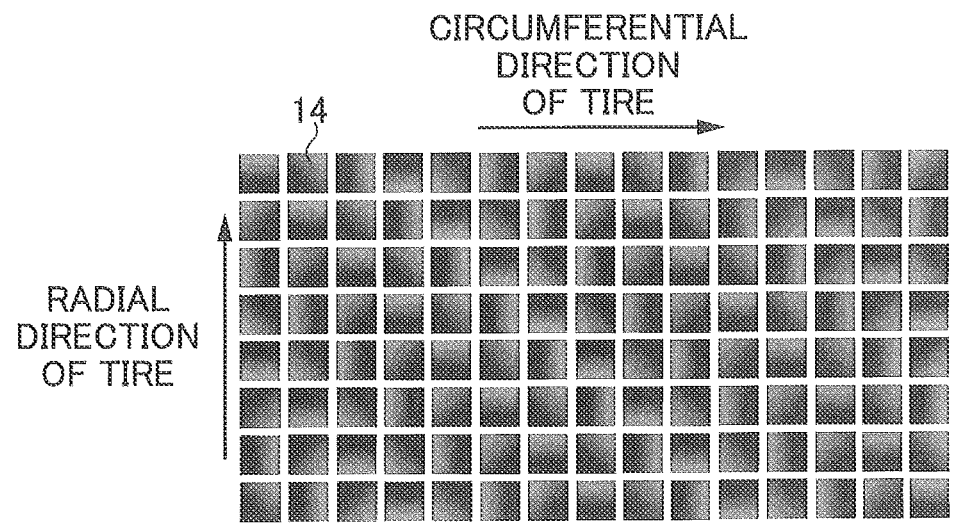
FIG. 8 illustrates a further modification of the embodiment shown in FIG. 1.

FIG. 8 is an illustration of a further modification of the embodiment of the pattern elements 14. The pattern elements 14 of the third modification are provided with an arrangement orientation identical to the arrangement orientation of the pattern elements 14 illustrated in FIG. 4A, but the pattern elements 14 form not a circular shape but rather a rectangular shape. In such pattern elements 14 as well, and as shown in FIG. 8, a viewer will still experience an optical illusion such that the pattern illustrated in FIG. 8 appears to have a three-dimensional unevenness. Thus, a viewer will still experience an optical illusion such that a three-dimensional unevenness appears to be present even in a case where the outer surface of the sidewall 3 of the tire 1 has been patterned as illustrated in FIG. 8. For this reason, even though there may be unevenness actually present on the outer surface of the sidewall 3, the actual unevenness is more readily obscured.

Figure 9:
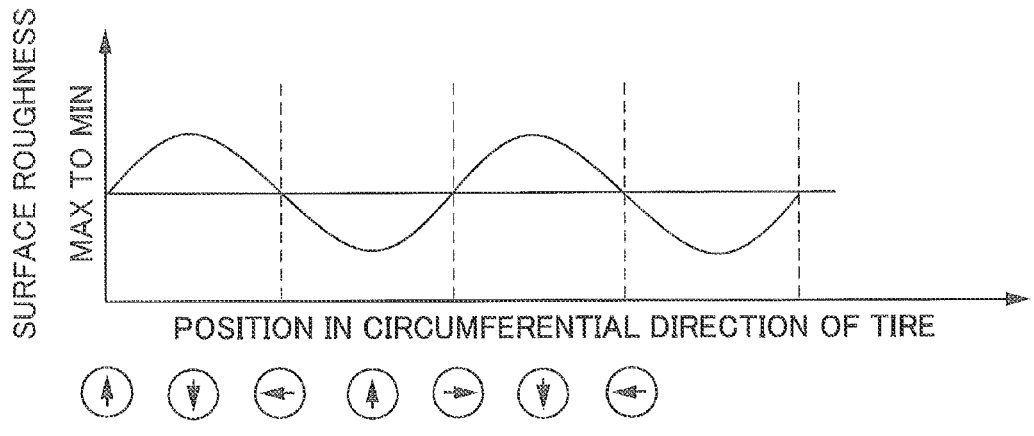
FIG. 9 illustrates still another modification of the embodiment shown in FIG. 1.

FIG. 9 is a drawing illustrating still another modification of the embodiment of the pattern elements 14. The pattern elements 14 of this modification are provided with an arrangement orientation identical to the arrangement orientation of the pattern elements 14 illustrated in FIG. 4A, but the difference in magnitude of the surface roughness on the pattern elements 14 changes in accordance with the arrangement orientation of the pattern elements 14. More specifically, when the focus falls on the circumferentially oriented pattern element rows as illustrated in FIG. 9, and when the horizontal axis represents the position in the circumferential direction and the vertical axis represents the difference in surface roughness between the portion of "greater roughness" (maximum Ra) and the portion of lesser roughness (minimum Ra) within the pattern elements 14; i.e., the difference in the value of the arithmetic average roughness Ra (maximum Ra minus minimum Ra), then the difference in the surface roughness fluctuates by the position in the circumferential direction. More specifically, the variation width between the maximum Ra and the minimum Ra for the surface roughness changes periodically in the circumferentially oriented pattern element rows. In this modification, causing the variation width, which is the difference in the surface roughness, to change periodically within the pattern illustrated in FIG. 4A more reliably causes a viewer to experience an optical illusion such that three-dimensional unevenness appears to be present. For this reason, even though there may actually be unevenness on the outer surface of the sidewall 3, the actual unevenness is readily obscured in an even more reliable manner.

Figure 10A:
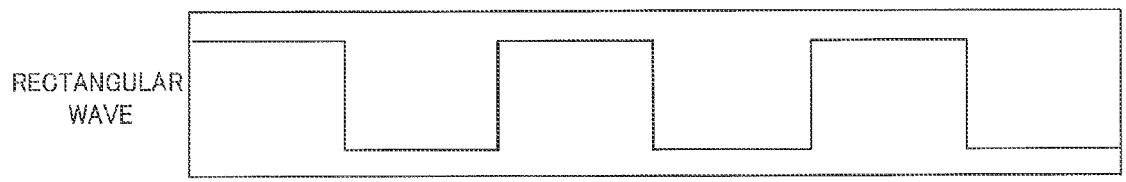
FIG. 10A illustrates another example of fluctuations in the variation width in the difference in the surface roughness of the pattern elements of the embodiment shown in FIG. 1.
Figure 10B:
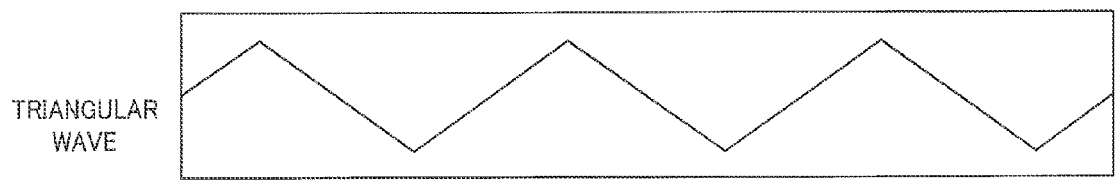
FIG. 10B illustrates a further example of fluctuations in the variation width in the difference in the surface roughness of the pattern elements of the embodiment shown in FIG. 1.
Figure 10C:
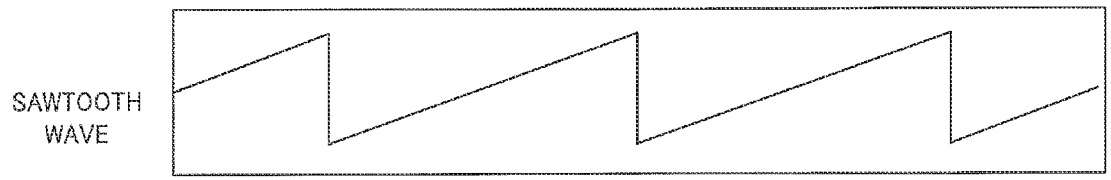
FIG. 10C illustrates still another example of fluctuations in the variation width in the difference in the surface roughness of the pattern elements of the embodiment shown in FIG. 1.

In such a case, the period of the fluctuations in the variation width of the difference in the surface roughness is preferably matched to the period of the arrangement orientation of the pattern elements 14, whereby the optical illusion is more reliably created. Also, in this modification, the variation width of the difference in the surface roughness fluctuates in the form of a sine wave, as illustrated in FIG. 9. However, the variation width of the difference in the surface roughness may also vary in the form of a rectangular wave, a triangular wave, or a sawtooth wave, as illustrated in FIGS. 10A to 10C.

FIGS. 11A to 11D are drawings describing still a further modification of the embodiment of the pattern elements 14. In this modification, the surface roughness of the pattern elements 14 comprises a portion of greater roughness (black portion) and a portion of lesser roughness (gray portion), the portion of greater roughness changing to the portion of lesser roughness in a stepwise manner. In the pattern elements 14 illustrated in FIG. 4A, the surface roughness changes continuously from the portion of greater roughness to the portion of lesser roughness. Therefore, a point of difference in the fifth modification is that the light-reflectance properties of the surface of the pattern elements 14 change in a stepwise manner in one direction. More specifically, the orientation of arrangement of the pattern elements 14 is determined by both the portion of greater roughness and the portion of lesser roughness. Even when such pattern elements 14 are applied to a pattern such as that illustrated in FIGS. 4A, 6A, and 7, each of these patterns will cause a viewer to experience an optical illusion such that a three-dimensional unevenness appears to be present. For this reason, even though there may actually be unevenness on the outer surface of the sidewall 3, the actual unevenness is more readily obscured.

Figure 11A:
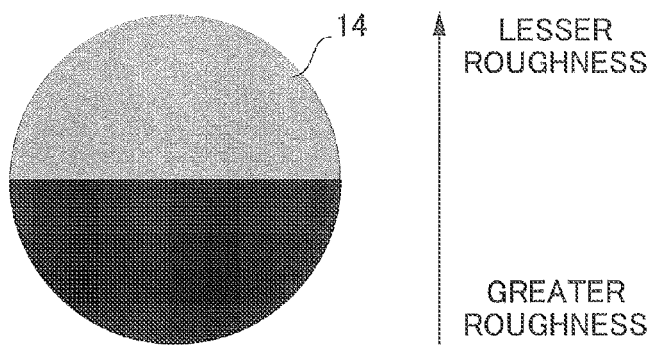
FIGS. 11A through 11D illustrate another modification of the embodiment shown in FIG. 1.
Figure 11B:
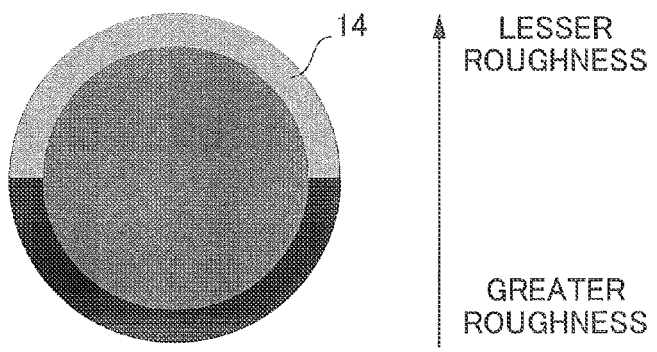
Figure 11C:
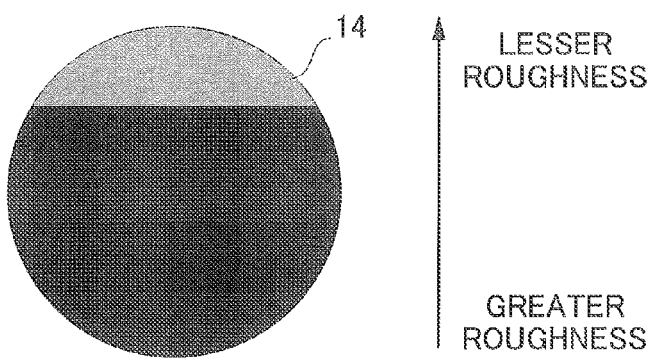
Figure 11D:
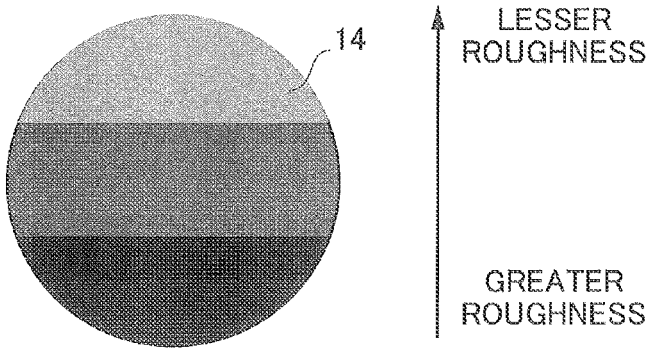

Furthermore, the roughness distribution such as that as illustrated in FIG. 11B can be used instead of the configuration of the pattern elements 14 illustrated in FIG. 11A to determine the arrangement orientation of the pattern elements 14. The surface area proportion of the portion of greater roughness (black portion) and the portion of lesser roughness (white portion) as illustrated in FIG. 11C can also be made different from the surface area proportion of the pattern elements 14 illustrated in FIG. 11A. In such a case, a region having an identical surface roughness, i.e., a region having identical light-reflectance properties, preferably accounts for 20 to 80% of the element surface area of the pattern elements 14 (this percentage ratio shall be referred to as the region surface area proportion). In the example illustrated in FIG. 11A, the region surface area proportions for the greater roughness and the lesser roughness are 50% and 50%, but in the example illustrated in FIG. 11C, the region surface area proportions are 80% and 20%. Furthermore, as illustrated in FIG. 11D, the pattern elements 14 may be provided with three portions which include moderate roughness in addition to the greater roughness and lesser roughness. In such a case, the region surface area proportions are 40%, 30%, and 30%. In a case where a region having an identical surface roughness; i.e., a region having identical light-reflectance properties within the pattern elements 14, is less than 20% or more than 80% of the element surface area of the pattern elements 14, then the change in the light-reflectance properties of the pattern elements 14 in one direction will be more prominent. Therefore, the pattern made by the pattern elements 14 will less readily cause a viewer to experience the effect of the optical illusion.

When the pattern elements 14 illustrated in FIGS. 11B to 11D are used, each of the patterns made by these pattern elements 14 will still cause a viewer to experience an optical illusion such that a three-dimensional unevenness appears to be present. For this reason, even though there may actually be unevenness on the outer surface of the sidewall 3, the actual unevenness is more readily obscured.

Figure 12:
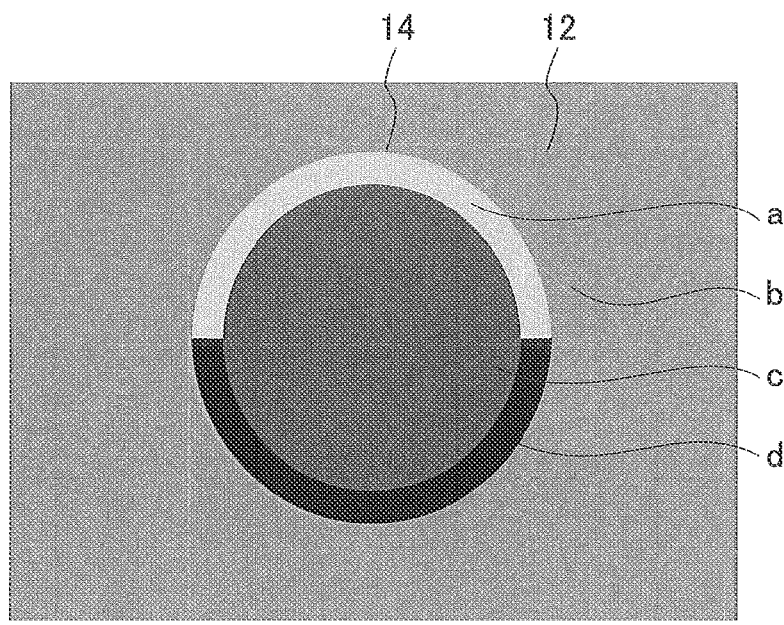
FIG. 12 illustrates a further modification of the embodiment shown in FIG. 1.
Figure 13:
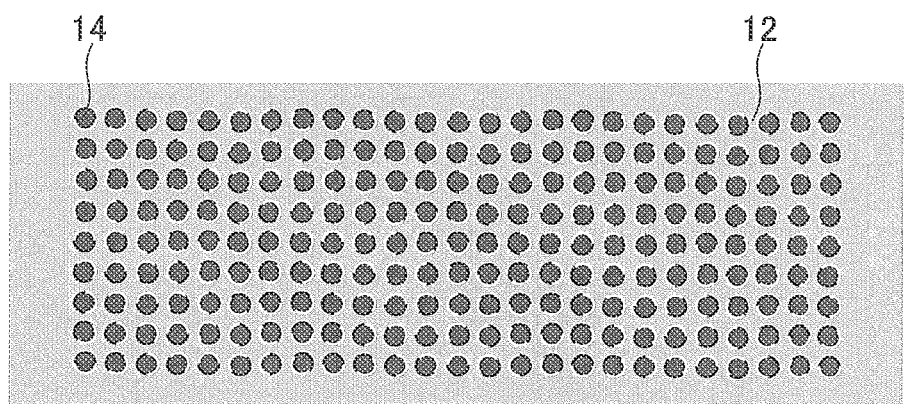
FIG. 13 illustrates another modification of the pattern elements of the embodiment shown in FIG. 1.

In another modification as illustrated in FIG. 12, the pattern elements 14 have aspects similar to the pattern elements illustrated in FIG. 11B, but the surface roughness of the pattern elements 14 and the surface roughness including the background surface 12 are of a determined sequence. More specifically, the reflectance properties of the pattern elements 14 and the background surface 12 are determined. That is, the surface roughness sequence is a, b, c, and d in increasing order, as illustrated in FIG. 12. With respect to the surface roughness of the background surface 12, the surface roughness of the background surface 12 follows the portion of lesser roughness (the portion having the minimum Ra) in the sequence. Determining the surface roughness of the pattern elements 14 and the background surface 12 in this manner makes it possible to create a pattern for giving an optical illusion of shading such as that illustrated in FIG. 13. In such a case as well, the pattern made by the pattern elements 14 still causes a viewer to experience an optical illusion such that a three-dimensional unevenness appears to be present. For this reason, even though there may actually be unevenness on the outer surface of the sidewall 3, the actual unevenness is more readily obscured.

Figure 14:
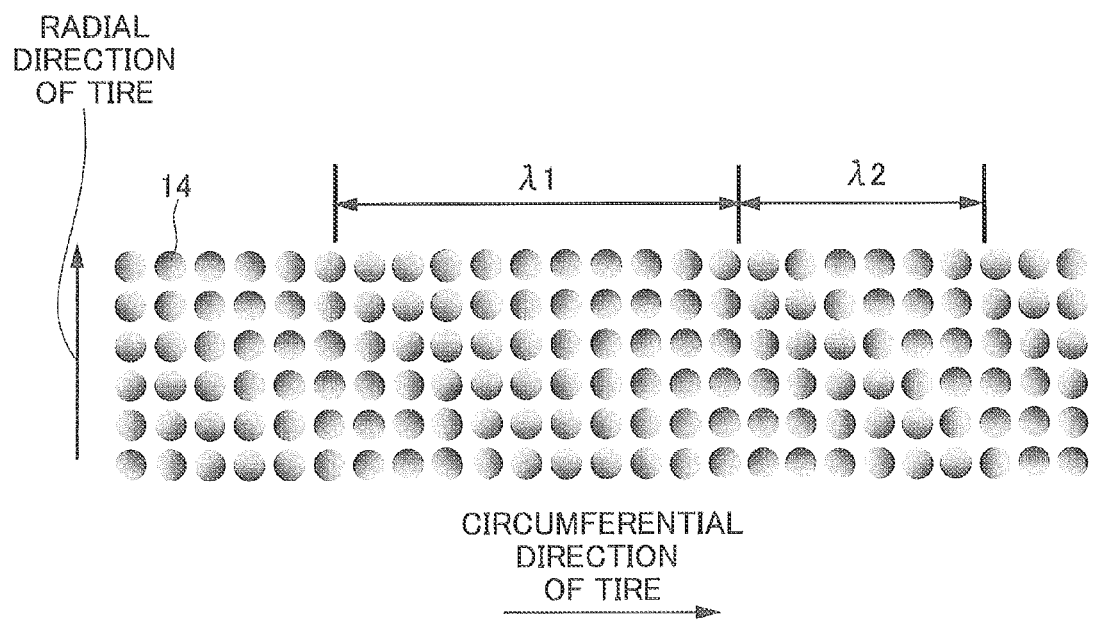
FIG. 14 illustrates an example of a pattern created by the pattern elements in the modification shown in FIG. 13.

FIG. 14 illustrates still another modification, and illustrates a pattern provided with an arrangement orientation for the pattern elements 14 that is different from the arrangement orientation of the pattern elements 14 illustrated in FIG. 4A. In this modification, the pattern elements 14 illustrated in FIG. 4B are arranged, but the arrangement orientation in the circumferential direction fluctuates between two different periods: period $\lambda 1$ and period $\lambda 2$. The pattern made by the pattern elements 14 still causes a viewer to experience an optical illusion such that a three-dimensional unevenness appears to be present. For this reason, even though there may actually be unevenness on the outer surface of the sidewall 3, the actual unevenness is more readily obscured.

When the pattern elements 14 illustrated in FIGS. 11A to 11D are used as the pattern elements 14 illustrated in FIG. 14, the pattern made by these pattern elements 14 still causes a viewer to experience an optical illusion such that a three-dimensional unevenness appears to be present. For this reason, even though there may actually be unevenness on the outer surface of the sidewall 3, the actual unevenness is more readily obscured.

In order to investigate the effects of the present embodiment, the pattern elements 14 were used to create a variety of different patterns on the sidewall 3, and the outer appearance was evaluated hereinafter with respect to the question of whether or not an evaluator was able to visually recognize an actually present unevenness created due to the overlapping of the carcass layer 5 illustrated in FIG. 3. The outer appearance was evaluated by 100 evaluators who were asked to decide whether or not the unevenness could be visually recognized.

The scores given by the evaluation were determined as follows. A score of 110 was given in cases where 95% or more of the evaluators were unable to visually recognize the actual unevenness. A score of 108 was given in cases where 90 to fewer than 95% of the evaluators were unable to visually recognize the actual unevenness. A score of 106 was given in cases where 80 to fewer than 90% of the evaluators were unable to visually recognize the actual unevenness. A score of 104 was given in cases where 70 to fewer than 80% of the evaluators were unable to visually recognize the actual unevenness. A score of 102 was given in cases where 60 to fewer than 70% of the evaluators were unable to visually recognize the actual unevenness. A score of 100 was given in cases where 50 to fewer than 60% of the evaluators were unable to visually recognize the actual unevenness. A score of 97 was given in cases where fewer than 50% of the evaluators were unable to visually recognize the actual unevenness.

Table 1 illustrates the specifications for the patterns as well as the evaluation results. The item "pattern element unevenness relative to outer surface of the sidewall" in Table 1 indicates whether the pattern elements 14 were depressed relative to the background surface 12 or were coplanar therewith. The item "pattern element surface roughness Ra (μm)" indicates a ratio between A to B and C to D, where A to B is the range (in microns) over which the minimum Ra fluctuates, and C to D is the range (in microns) over which the maximum Ra fluctuates, as illustrated in FIG. 9.

In examples 1 to 4, there are either two levels of surface roughness in the pattern elements 14: a greater roughness and a lesser roughness, or three: a greater roughness, a moderate roughness, and a lesser roughness. In examples 5 to 7, the variation width in the surface roughness Ra of the two portions of the greater roughness and the lesser roughness in the surface roughness levels of the pattern elements 14 fluctuates in the circumferential direction, as illustrated by FIG. 9. In a comparative example, the surface roughness Ra is fixed. The sign "←" written in the columns in Table 1 indicates that the data is identical to that shown in the column to the left

TABLE 1

| | Example 1 | Example 2 | Example 3 | Example 4 | Example 5 | Example 6 | Example 7 | Comparative Example |
|---|---|---|---|---|---|---|---|---|
| Unevenness of pattern elements on outer surface of sidewall | No unevenness (flat) | Unevenness (0.3 mm) | ← | ← | ← | ← | ← | ← |
| Surface roughness Ra of pattern elements (μm) | 0.7/1.7 | ← | ← | ← | 0.7/1.7 | 0.4 to 0.7/ 1.7 to 2.5 | ← | 1.6 |
| Surface area proportion of region among pattern elements (%) | 50%/50% | 20%/80% | 30%/70% | 30%/40%/30% | Continuous | ← | ← | — |
| Total element surface area of pattern elements/pattern region surface area (%) | 60% | ← | ← | ← | 80% | 80% | ← | ← |
| Does the surface roughness variation width between max Ra and min Ra have a period? | No | ← | ← | ← | ← | Yes | ← | — |
| Are there a plurality of periods in the changes in arrangement orientation? | No | ← | ← | ← | ← | ← | Yes | — |
| Outer appearance evaluation | 100 | 100 | 102 | 104 | 106 | 108 | 110 | 97 |

Table 1 shows that the examples 1 to 7 have an improved evaluation of the outer appearance in contrast to the comparative example. It thus follows that the pneumatic tire of the present embodiment makes it possible to sufficiently obscure unevenness present on the outer surface of the sidewall.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A pneumatic tire comprising:
a plurality of sidewalls and a tread pattern between the sidewalls, at least one of the sidewalls having an outer surface comprising
a plurality of pattern elements, each defining an identical contour shape, the pattern elements being arranged in succession in a circumferential direction of the pneumatic tire to form a plurality of circumferentially oriented pattern element rows, and the pattern elements being arranged in succession in a radial direction of the pneumatic tire relative to each of the respective pattern elements of the circumferentially oriented pattern element rows to form a plurality of radially oriented pattern element rows; and
a background surface enclosing each of the pattern elements of the circumferentially oriented pattern element rows and the radially oriented pattern element rows;
each of the pattern elements having an orientation defined by light-reflectance properties in each of the plurality of pattern elements changing in one direction in a continuous manner or in a stepwise manner to define an arrangement orientation in which each of the plurality of pattern elements is arranged relative to the circumferential or radial direction;
the arrangement orientation changing periodically along the circumferential direction when the plurality of pattern elements are viewed along each of the circumferentially oriented pattern element rows; and
the arrangement orientation being different between adjacent pattern elements while the plurality of pattern elements are viewed along each of the radially oriented pattern element rows, and an absolute value of a difference in angle of the arrangement orientation between adjacent pattern elements being 45 degrees or less and fixed.

2. The pneumatic tire as set forth in claim 1, wherein a surface roughness of each of the plurality of pattern elements changes in one direction to change light-reflectance properties.

3. The pneumatic tire as set forth in claim 2, wherein the surface light-reflectance properties in each of the plurality of pattern elements change in a stepwise manner in one direction, and a region having the same light-reflectance properties accounts for 20% to 80% of an element surface area of each of the plurality of pattern elements.

4. The pneumatic tire as set forth in claim 2, wherein in each of the circumferentially oriented pattern element rows, a separation distance between pattern elements adjacent in the circumferential direction of the pneumatic tire with respect to the plurality of pattern elements is no greater than a maximum width, in the circumferential direction of the pneumatic tire, of each of the plurality of pattern elements; and
a sum of the element surface areas of the plurality of pattern elements is at least 50% of a surface area of a pattern region where the plurality of pattern elements are enclosed by the background surface.

5. The pneumatic tire as set forth in claim 2, wherein a surface roughness of each of the plurality of pattern elements change in one direction to change the light-reflectance properties, and a variation range between a maximum roughness and a minimum roughness of the surface roughness changes periodically within the circumferentially oriented pattern element rows.

6. The pneumatic tire as set forth in claim 5, wherein the variation range changes in the same period as periodic changes of the arrangement orientation in each of the circumferentially oriented pattern element rows; and
the arrangement orientation in each of the circumferentially oriented pattern element rows undergoes periodic changes over a plurality of periods.

7. The pneumatic tire as set forth in claim 1, wherein the surface light-reflectance properties in each of the plurality of pattern elements change in a stepwise manner in one direction, and a region having the same light-reflectance properties accounts for 20% to 80% of an element surface area of each of the plurality of pattern elements.

8. The pneumatic tire as set forth in claim 7, wherein in each of the circumferentially oriented pattern element rows, a separation distance between pattern elements adjacent in the circumferential direction of the pneumatic tire with respect to the plurality of pattern elements is no greater than a maximum width, in the circumferential direction of the pneumatic tire, of each of the plurality of pattern elements; and
a sum of the element surface areas of the plurality of pattern elements is at least 50% of a surface area of a pattern region where the plurality of pattern elements are enclosed by the background surface.

9. The pneumatic tire as set forth in claim 7, wherein a surface roughness of each of the plurality of pattern elements change in one direction to change the light-reflectance properties, and a variation range between a maximum roughness and a minimum roughness of the surface roughness changes periodically within the circumferentially oriented pattern element rows.

10. The pneumatic tire as set forth in claim 9, wherein the variation range changes in the same period as periodic changes of the arrangement orientation in each of the circumferentially oriented pattern element rows; and
the arrangement orientation in each of the circumferentially oriented pattern element rows undergoes periodic changes over a plurality of periods.

11. The pneumatic tire as set forth in claim 1, wherein in each of the circumferentially oriented pattern element rows, a separation distance between pattern elements adjacent in the circumferential direction of the pneumatic tire with respect to the plurality of pattern elements is no greater than a maximum width, in the circumferential direction of the pneumatic tire, of each of the plurality of pattern elements; and
a sum of the element surface areas of the plurality of pattern elements is at least 50% of a surface area of a pattern region where the plurality of pattern elements are enclosed by the background surface.

12. The pneumatic tire as set forth in claim 11, wherein a surface roughness of each of the plurality of pattern elements change in one direction to change the light-reflectance properties, and a variation range between a maximum roughness and a minimum roughness of the surface roughness changes periodically within the circumferentially oriented pattern element rows.

13. The pneumatic tire as set forth in claim 1, wherein a surface roughness of each of the plurality of pattern elements change in one direction to change the light-reflectance properties, and a variation range between a maximum roughness and a minimum roughness of the surface roughness changes periodically within the circumferentially oriented pattern element rows.

14. The pneumatic tire as set forth in claim 13, wherein the variation range changes in the same period as periodic changes of the arrangement orientation in each of the circumferentially oriented pattern element rows; and
the arrangement orientation in each of the circumferentially oriented pattern element rows undergoes periodic changes over a plurality of periods.

15. The pneumatic tire as set forth in claim 1, wherein a size of the plurality of pattern elements decreases in an inward progression in the radial direction of the pneumatic tire while the same contour shape is maintained when the plurality of pattern elements are viewed along the radially oriented pattern element rows.

16. The pneumatic tire as set forth in claim 1, wherein the circumferentially oriented pattern element rows have periodic wavelike fluctuations in the radial direction of the pneumatic tire.

17. The pneumatic tire as set forth in claim 1, wherein the radially oriented pattern element rows have periodic wavelike fluctuations in the circumferential direction of the pneumatic tire.

18. The pneumatic tire as set forth in claim 1, wherein the pattern elements form either a circular shape or a rectangular shape.

19. The pneumatic tire as set forth in claim 1, wherein while the plurality of pattern elements are viewed along each of the radially oriented pattern element rows, the radially oriented pattern element rows have a portion where a direction in which the arrangement orientation between adjacent pattern elements changes is reversed.

20. The pneumatic tire as set forth in claim 1, wherein the circumferentially oriented pattern element rows, the radially oriented pattern element rows, and the background surfaces are provided to a pattern display region on the outer surface of the sidewall, and the pattern display region encloses a marking display region provided to the outer surface of the sidewall of the pneumatic tire.

* * * * *